(12) United States Patent
Ferrari et al.

(10) Patent No.: US 10,612,806 B2
(45) Date of Patent: Apr. 7, 2020

(54) HVAC, REFRIGERATION, AND AUTOMATION EQUIPMENT SCHEDULING

(71) Applicant: Lennox Industries Inc., Richardson, TX (US)

(72) Inventors: Harold Ferrari, Frisco, TX (US); Veera Reddy Vemula, McKinney, TX (US); Farhad Abrishamkar, Dallas, TX (US)

(73) Assignee: Lennox Industries Inc., Richardson, TX (US)

( * ) Notice: Subject to any disclaimer, the term of this patent is extended or adjusted under 35 U.S.C. 154(b) by 115 days.

(21) Appl. No.: 15/874,556

(22) Filed: Jan. 18, 2018

(65) Prior Publication Data

US 2018/0209678 A1 Jul. 26, 2018

Related U.S. Application Data

(60) Provisional application No. 62/448,597, filed on Jan. 20, 2017.

(51) Int. Cl.
*F24F 11/00* (2018.01)
*F24F 11/54* (2018.01)
(Continued)

(52) U.S. Cl.
CPC ............ *F24F 11/54* (2018.01); *F24F 11/30* (2018.01); *F24F 11/49* (2018.01); *F24F 11/56* (2018.01);
(Continued)

(58) Field of Classification Search
CPC .. F24F 11/30; F24F 11/49; F24F 11/54; F24F 11/56; F24F 11/64; F24F 11/65; G05B 15/00; G05B 19/00
See application file for complete search history.

(56) References Cited

U.S. PATENT DOCUMENTS 9,342,082 B2 *  5/2016  Guenette ............... G05B 15/02
2003/0070438 A1  4/2003  Kikuchi et al.
(Continued)

FOREIGN PATENT DOCUMENTS

EP      2818801 A1    12/2014
WO   2016157498 A1   10/2016

OTHER PUBLICATIONS

European Patent Office, Extended European Search Report, Application No. 18152607.0, 6 pages.

*Primary Examiner* — Mark A Connolly
(74) *Attorney, Agent, or Firm* — Baker Botts L.L.P.

(57) ABSTRACT

A controller configured to communicatively couple to at least two sets of equipment. At least one set of equipment includes heating, ventilation, and air conditioning (HVAC) equipment, refrigeration equipment, or building automation equipment. For each set of equipment, the controller determines an operation schedule for the respective set of equipment. The controller also communicates the operation schedule to the respective set of equipment, for each set of equipment. The controller may receive a request to perform mass scheduling. The request indicates which sets of equipment and which settings of the operation schedule are to be configured using the mass scheduling. The controller may also communicate the same values for the settings that the request indicates to configure using the mass scheduling to each set of equipment that the request indicates to configure using the mass scheduling.

17 Claims, 4 Drawing Sheets

(51) Int. Cl.
  *G05B 19/042* (2006.01)
  *F24F 11/49* (2018.01)
  *F24F 11/64* (2018.01)
  *F24F 11/65* (2018.01)
  *F24F 11/56* (2018.01)
  *F24F 11/30* (2018.01)
  *G05B 15/00* (2006.01)

(52) U.S. Cl.
  CPC .............. *F24F 11/64* (2018.01); *F24F 11/65* (2018.01); *G05B 19/042* (2013.01); *G05B 15/00* (2013.01); *G05B 2219/2614* (2013.01)

(56) References Cited

U.S. PATENT DOCUMENTS

| | | |
|---|---|---|
| 2014/0365016 A1 | 12/2014 | Hartley et al. |
| 2015/0369503 A1* | 12/2015 | Flaherty .............. F24D 19/1084 700/277 |
| 2016/0154413 A1* | 6/2016 | Trivedi .............. G05D 23/1917 700/276 |
| 2016/0320084 A1* | 11/2016 | Hashimoto .............. F24F 11/62 |

* cited by examiner

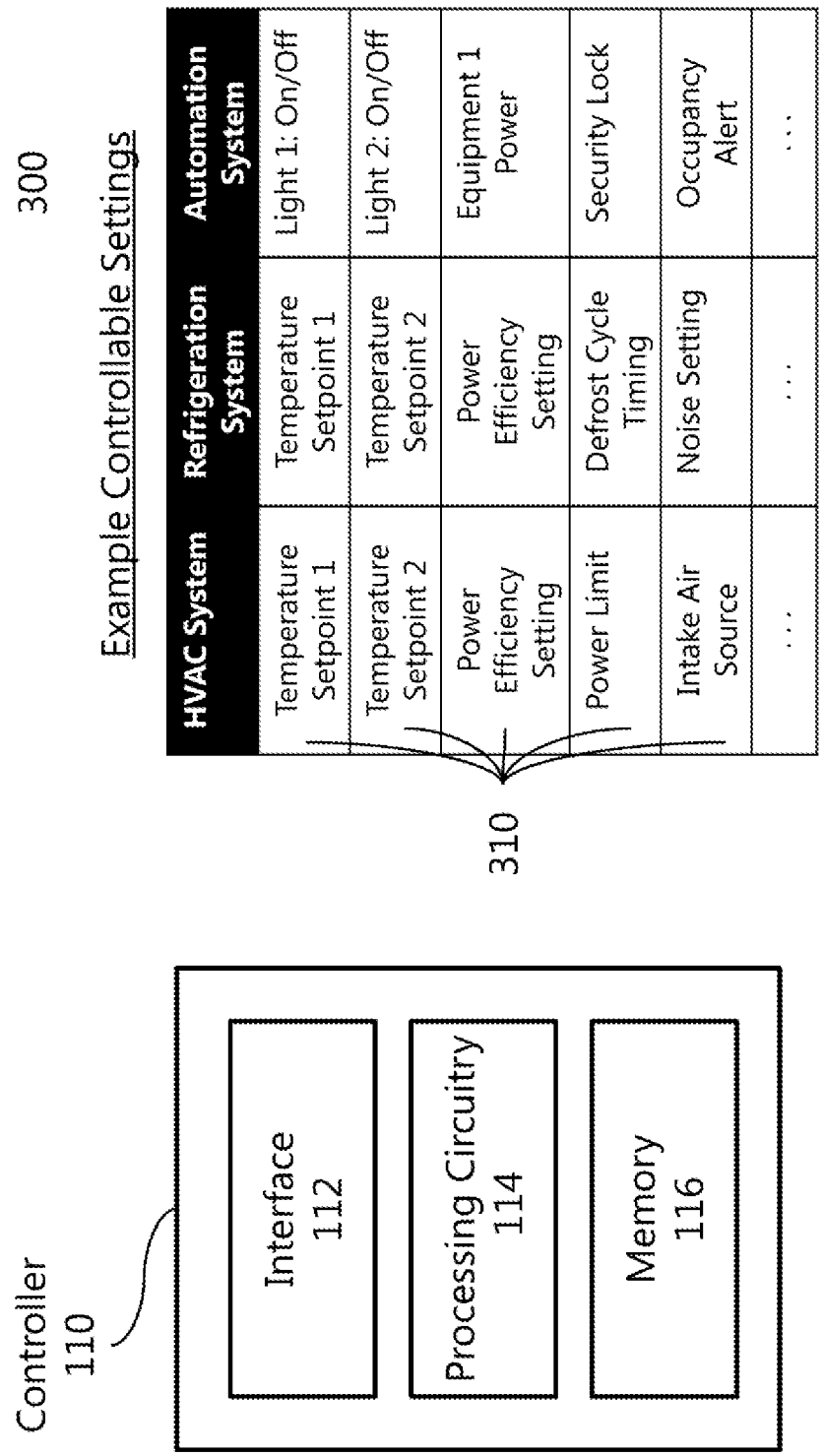

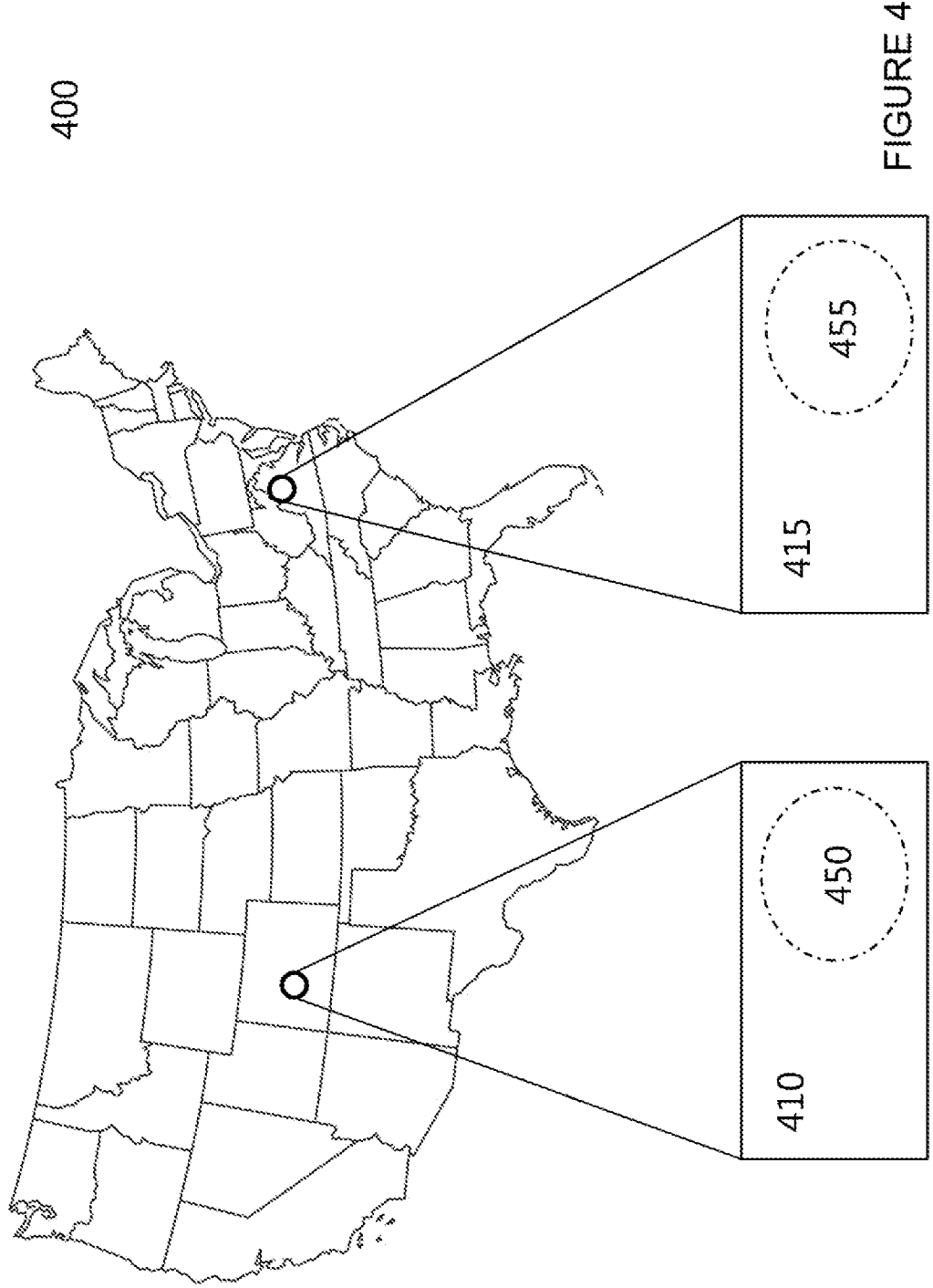

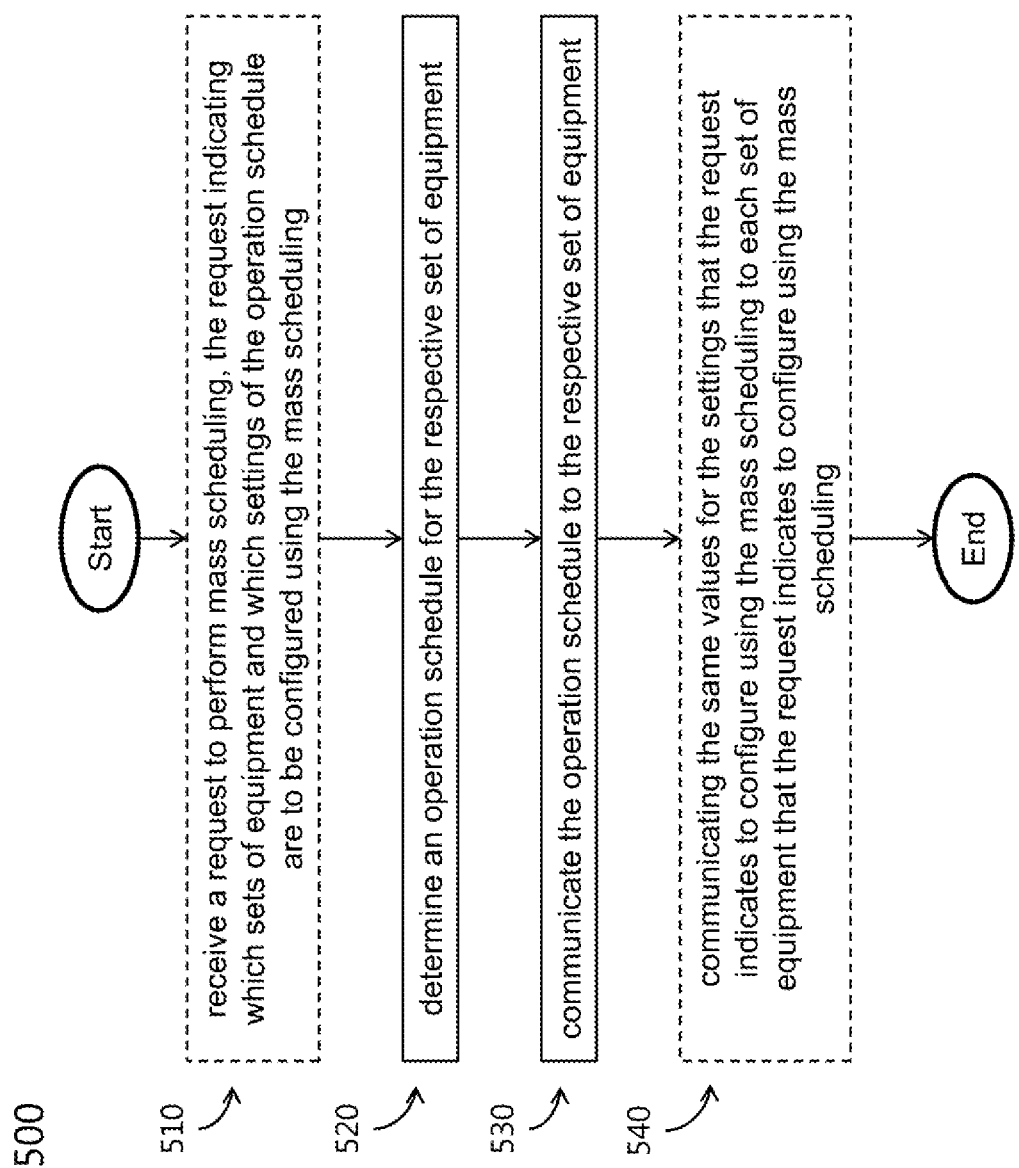

HVAC, REFRIGERATION, AND AUTOMATION EQUIPMENT SCHEDULING

RELATED APPLICATIONS

This application claims priority to and the benefit of U.S. Provisional Patent Application No. 62/448,597, filed Jan. 20, 2017 and entitled "HVAC AND AUTOMATION EQUIPMENT CONTROLLER," the contents of which are herein incorporated by reference in their entirety.

TECHNICAL FIELD

Certain embodiments of this disclosure relate generally to systems including two or more sets of equipment that may include heating, ventilation, and air conditioning (HVAC) systems, refrigeration systems, or automation systems, and more specifically, to scheduling the respective sets of equipment.

BACKGROUND

Individual buildings, sites, or other spaces may include a set of equipment including one or more heating, ventilation, and air conditioning (HVAC) systems, a refrigeration systems, or automation systems. Each type of system may be locally controlled and an operator of those systems may apply a schedule or set of rules that control the operation of each respective system. Conventional systems are isolated from one another, requiring the scheduling of each system individually, and separate controllers for each type of system. Accordingly, sites with many types of systems or operators with many systems operating at different locations may require great effort to consistently and synergistically schedule all of the systems. This may also apply even when sites include the same types and configurations of systems, such as at restaurant franchises.

SUMMARY OF THE DISCLOSURE

According to one embodiment, a system includes at least two sets of equipment. Each set of equipment includes at least one of a heating, ventilation, and air conditioning (HVAC) equipment, refrigeration equipment, or building automation equipment. The system also includes a controller. The controller is configure to communicatively couple to each set of equipment. The controller, for each set of equipment, is further configured to determine an operation schedule for the respective set of equipment and communicate the operation schedule to the respective set of equipment.

In particular embodiments, the at least two sets of equipment include a first set of equipment with a first configuration and a second set of equipment with a second configuration. The first set of equipment is located in a different location than the second set of equipment. The controller is further configured to determine that at least a portion of the first configuration is the same as at least a portion of the second configuration. In response, the controller is further configured to set at least a portion of a first operation schedule for the first set of equipment to be the same as at least a portion of a second operation schedule for the second set of equipment.

In particular embodiments, differences between the first operation schedule and the second operation schedule are based on differences between locations, ambient environments, geographical regions, and/or configurations of the first and second sets of equipment.

In particular embodiments, the controller is further configured to receive a request to perform mass scheduling. The request indicates which sets of equipment and which settings of the operation schedule are to be configured using the mass scheduling. The controller is further configured to communicate the same values for the settings that the request indicates to configure using the mass scheduling to each set of equipment that the request indicates to configure using the mass scheduling.

In particular embodiments, the system is further configured to remotely schedule each set of equipment.

According to another embodiment, a controller is configured to communicatively couple to at least two sets of equipment. At least one set of equipment includes heating, ventilation, and air conditioning (HVAC) equipment, refrigeration equipment, or building automation equipment. For each set of equipment, the controller is configured to determine an operation schedule for the respective set of equipment. The controller is further configured to communicate the operation schedule to the respective set of equipment, for each set of equipment In particular embodiments, the controller is further configured to remotely schedule each set of equipment.

In particular embodiments, the at least two sets of equipment include a first set of equipment with a first configuration and a second set of equipment with a second configuration. The first set of equipment is located in a different location than the second set of equipment. The controller is further configured to determine that at least a portion of the first configuration is the same as at least a portion of the second configuration. In response, the controller is configured to set at least a portion of a first operation schedule for the first set of equipment to be the same as at least a portion of a second operation schedule for the second set of equipment.

In particular embodiments, differences between the first operation schedule and the second operation schedule are based on differences between locations, ambient environments, geographical regions, and/or configurations of the first and second sets of equipment.

In particular embodiments, the controller is further operable to receive first telemetry data associated with the first set of equipment. The controller is further configured to adjust the first operation schedule based on the first telemetry data. The controller is further configured to receive second telemetry data associated with the second set of equipment. The controller is further configured to adjust the second operation schedule based on the second telemetry data.

In particular embodiments, the controller is further configured to communicate the operation schedule to a first set of equipment and a second set of equipment simultaneously.

In particular embodiments, the at least two sets of equipment include a first set of HVAC equipment located in a first geographical region and a first set of building automation equipment located in the first geographical region. The at least two sets of equipment further includes a second set of HVAC equipment located in a second geographical region and a second set of building automation equipment located in the second geographical region.

In particular embodiments, the controller is further configured to receive a request to perform mass scheduling. The request indicates which sets of equipment and which settings of the operation schedule are to be configured using the mass scheduling. The controller is further configured to communicate the same values for the settings that the request indicates to configure using the mass scheduling to each set of equipment that the request indicates to configure using the mass scheduling.

According to yet another embodiment, a method includes communicatively coupling to at least two sets of equipment. The at least one set of equipment includes heating, ventilation, and air conditioning (HVAC) equipment, refrigeration equipment, or building automation equipment. The method also includes, for each set of equipment, determining an operation schedule for the respective set of equipment. The method also includes, for each set of equipment, communicating the operation schedule to the respective set of equipment.

In particular embodiments, the at least two sets of equipment include a first set of equipment with a first configuration and a second set of equipment with a second configuration. The first set of equipment located in a different location than the second set of equipment. The method further includes determining that at least a portion of the first configuration is the same as at least a portion of the second configuration. In response, the method further includes setting at least a portion of a first operation schedule for the first set of equipment to be the same as at least a portion of a second operation schedule for the second set of equipment.

In particular embodiments, differences between the first operation schedule and the second operation schedule are based on differences between locations, ambient environments, geographical regions, and/or configurations of the first and second sets of equipment.

In particular embodiments, the method further includes receiving first telemetry data associated with the first set of equipment and adjusting the first operation schedule based on the first telemetry data. The method further includes receiving second telemetry data associated with the second set of equipment and adjusting the second operation schedule based on the second telemetry data.

In particular embodiments, the method further includes communicating the operation schedule to a first set of equipment and a second set of equipment simultaneously.

In particular embodiments, the at least two sets of equipment include a first set of HVAC equipment located in a first geographical region, a first set of building automation equipment located in the first geographical region, and a first set of refrigeration equipment located in the first geographical region. The at least two sets of equipment also include a second set of HVAC equipment located in a second geographical region, a second set of building automation equipment located in the second geographical region, and a second set of refrigeration equipment located in the second geographical region.

In particular embodiments, the method further includes receiving a request to perform mass scheduling. The request indicates which sets of equipment and which settings of the operation schedule are to be configured using the mass scheduling. The method further includes communicating the same values for the settings that the request indicates to configure using the mass scheduling to each set of equipment that the request indicates to configure using the mass scheduling.

Certain embodiments may provide one or more technical advantages. For example, certain embodiments may determine the schedules of multiple sets of equipment at a centralized system and communicate that schedule to each respective set of equipment. In this manner, multiple sets of equipment may be scheduled concurrently through a single system, reducing the need for an operator to separately schedule each set of equipment or different types of equipment within each set of equipment. As another example, certain embodiments may allow information about other sets of equipment to be used in determining the schedule for other sets of equipment. In this manner, similarities and differences between different sets of equipment may be analyzed and used to apply the same schedules to like configurations and adjusting schedules to accommodate differences. As a result, more optimal scheduling may be provided from the centralized system. As yet another example, certain embodiments allow the system to mass schedule multiple sets of equipment at the same time. Accordingly, a single schedule may be applied to multiple sets of equipment simultaneously, reducing the need to individually schedule each set.

Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which:

FIG. 2 is an example block diagram of a controller configured to schedule the connected sets of connected equipment, according to certain embodiments;

FIG. 3 is a table of example settings which may be controllable at respective connected equipment of the example system, according to certain embodiments;

FIG. 4 is an example diagram of sites at different locations each having a respective set of equipment, according to certain embodiments; and FIG. 5 is a flowchart diagram of an example method of using the example system, according to certain embodiments.

DETAILED DESCRIPTION

Figure 1:
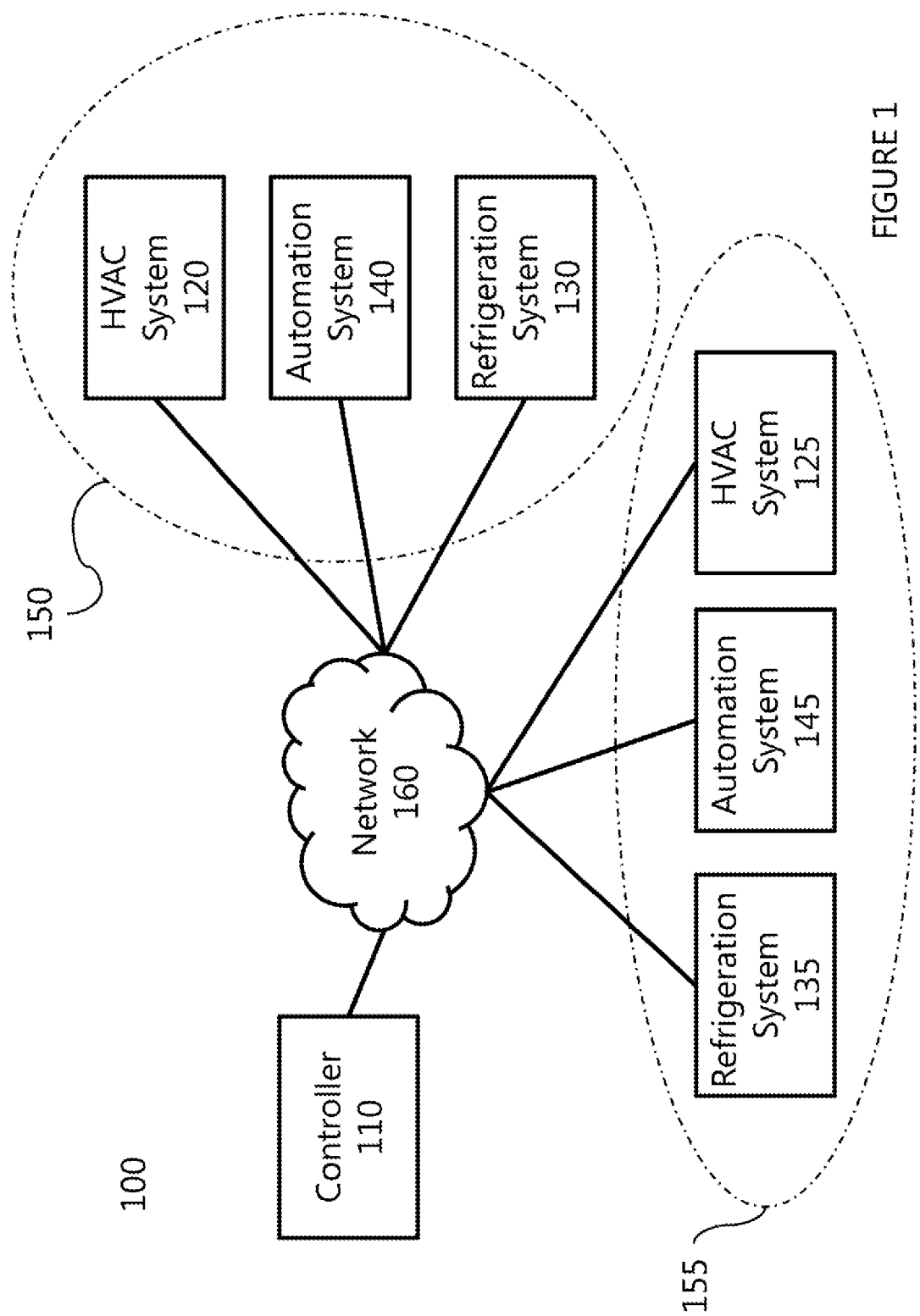
FIG. 1 illustrates an example system including two sets of equipment, according to certain embodiments.

Embodiments of the present disclosure and its advantages are best understood by referring to FIGS. 1 through 5 of the drawings, like numerals being used for like and corresponding parts of the various drawings.

Buildings and other structures often utilize equipment to provide an optimal environment. A number of devices and equipment may be placed within a building to provide heating, cooling, lighting, airflow, refrigeration, energy monitoring, among other desired functions. For example, a building may include one or more of a heating, ventilation, and air conditioning (HVAC) system, a refrigeration system, and an automation system. Each of these pieces of equipment not only has to be installed, but also programmed to run at certain times or in response to certain inputs. Scheduling each system requires an operator to set a schedule for each individual piece of equipment of the system. Generally, individual areas may have their own controllers to control the equipment in that space. For example, each section of a building may have its own controller to control equipment (e.g., the set points of HVAC equipment 120 controlling the space or any other suitable type of equipment). As another example, separate building may have their own controllers to control equipment. The rules set for a particular section may not be applied to other sections, requiring individual application of rules and scheduling. Accordingly, sites with many systems operating at different locations may require great effort to consistently and synergistically schedule all of the systems. This disclosure contemplates systems and methods that may provide an efficient solution to controlling, scheduling, and maintaining the various pieces of equipment that may be installed in one or more spaces.

FIG. 1 illustrates an example system 100 including one or more heating, ventilation, and air conditioning (HVAC) systems 120, 125, refrigeration systems 130, 135, and automation systems 140, 145 according to certain embodiments. Each of HVAC systems 120, 125 refrigeration systems 130, 130, and automation systems 140, 145 may be configured to have a variety of HVAC, refrigeration, and automation equipment with different functions and capabilities. For example, HVAC system 120 may include one or more HVAC units serving different areas of a building. Similarly, refrigeration system 130 may include one or more refrigeration units at different locations at a site or within a building. Likewise, automation system 140 may include control systems for dozens of light fixtures, security systems, and monitoring sensors spread across multiple floors and rooms of one or more buildings.

HVAC systems 120, 125 may be controlled by the controller 110 based on temperature set points and/or the occupancy of a space covered by the HVAC systems 120, 125. In certain embodiments, controller 110 may be used to set a schedule for the operation of HVAC equipment 120, 125 which may include the changing of settings, such as temperature set points and occupancy settings, based on the date, day of the week, time of day, or other characteristics. Example of HVAC equipment that may be present in HVAC systems 120, 125 may include, but are not limited to, air conditioners, heaters, condensing units, ventilation units, window units, wall units, and air filtration systems. HVAC systems 120, 125 may also include blowers and fans, including any type of blower or fan for moving a volume of air or gas. HVAC systems 120, 125 may further include one or more variable refrigerant flow equipment.

A space may also include refrigeration systems 130, 135 which may also be controlled through controller 110. Refrigeration systems 130, 135 may include one or more coolers, freezers, refrigeration cases, etc., which may provide a more localized environmental control to specific spaces within a building. Examples of refrigeration equipment that may be present in refrigeration systems 130 may include, but are not limited to, reach-in refrigerators, reach-in freezers, merchandising refrigerators, merchandising freezers, walk-in refrigerators, walk-in freezers, commercial refrigerators, and commercial freezers.

A space may also include automation system 140, 145, which can be automated and/or controlled based on certain conditions. Such automation equipment 140, 145 may include lights, kitchen equipment, sensors, door locks, or any other devices that may be controlled and/or operated. Controller 110 may operate to set a schedule for the operation of the automation systems 140, 145 which may include the changing of settings, such as temperature set points and occupancy settings, based on the date, day of the week, time of day, or other characteristics. Controller 110 may operate to communicate alerts based on information received by HVAC systems 120, 125, refrigeration systems 130, 135 and/or automation equipment 140, 145.

Each of HVAC systems 120, 125, refrigeration systems 130, 135 and automation system 140, 145 may include components such as sensors and switches that work with the functional portions of each system to sense the conditions within each system and control its operation. Examples of sensors include, but are not limited to, temperature sensors, humidity sensors, light sensors, occupancy sensors, motion sensors, proximity sensors, sound sensors, touch sensors, and pressure sensors. Examples of switches include, but are not limited to, pressure switches, toggle switches, mechanical switches, electronic switches, mercury tilt switches, touch switches, push button switches, rotary switches, and momentary switches. Each sensor and/or switch may generate data, which may be communicated to controller 110.

In certain embodiments, certain ones of HVAC systems 120, 125, refrigeration systems 130, 135, and automation systems 140, 145 may be grouped into one or more sets. For example, FIG. 1 depicts a first set 150 including HVAC system 120, refrigeration system 130, and automation system 140 and a second set 155 including HVAC system 125, refrigeration system 135 and automation system 145. In some embodiments, first set 150 and second set 155 may comprise the same types of systems. For example, FIG. 1 illustrates an embodiment in which first set 150 and second set 155 each include the following types of systems: an HVAC system 120/125, a refrigeration system 130/135, and an automation system 140/145. The type of equipment within systems of the same type may be the same or different. For example, they type of equipment in HVAC system 120, such as the model or version of equipment, number of compressors, condensors, etc. or other configuration may be the same as or different than the type of equipment in HVAC system 125. In certain alternative embodiments, first set 150 and second set 155 may comprises different types of systems. For example, first set 150 might include a refrigeration system 130, but second set 155 might not include any refrigeration system 135 (contrary to the example shown in FIG. 1). In some embodiments, first set 150 and second set 155 may include the exact same equipment and configurations thereof. For example, first set 150 and second set 155 may be the set of equipment at two locations of a restaurant chain that were designed similarly.

First set 150 and second set 155 may be based on any suitable grouping. For example, each of first set 150 and second set 155 may be based on a common location of each system in their respective set. For example, HVAC system 120, refrigeration system 130, and automation system 140 may be grouped in set 150 because they all operate within a building or site. In some embodiments, the equipment may be grouped into higher order sets, such as the location of equipment, the region in which the equipment is located, and/or the operator of the equipment. In some embodiments, the higher order sets may be arranged according to a hierarchy. As an example, the network may include equipment grouped according to operators, such as operators A, B, C, . . . N. Operator A may operate sets of equipment in four regions, such as regions A-1 (e.g., North), A-2 (e.g., South), A-3 (e.g., East), and A-4 (e.g., West). Region A-1 may include equipment in two sites, such as sites A-1($a$) and A-1($b$). Equipment site A-1($a$) may include equipment on three floors, such as floors A-1($a$)(1), A-1($a$)(2), and A-1($a$)(3). Although the example describes a hierarchy having four levels, other embodiments could include more, fewer, or different levels in a hierarchy.

In certain embodiments, system 100 further includes network 160. Network 160 may be any communications network, such as a private network, a public network, a connection through the internet, a mobile network, a WI-FI network, etc. Each of HVAC systems 120, 125 refrigeration systems 130, 130, and automation systems 140, 145 may be communicatively coupled to network 160. For example, each system or equipment contained therein may include one or more interfaces in which to communicate over network 160. Network 160 may facilitate the transmission of commands and other data between equipment in first set 150 and second set 155 and external systems, such as controller 110. For example, schedules determined at controller 110 may be communicated to the individual sets of equipment over network 160. In this manner, a centralized scheduling system may be realized without comprising the ability to schedule equipment located at different locations.

Controller 110 may be communicatively coupled to one or more of HVAC systems 120, 125, refrigeration systems 130, 135, and automation system 140, 145. For example, controller 110 may be located remote to the location(s) of one or more of the systems, but coupled to one or more of the systems through a communication link or links. As described in further detail below, controller 110 may be configured to receive and send data to and from each of HVAC systems 120, 125 refrigeration systems 130, 135, and automation system 140, 145. For example, controller 110 may communicate schedules for the equipment in each system. In this manner, multiple equipment may be scheduled at a centralized system.

FIG. 2 illustrates controller 110 coupled to system 100, in accordance with certain embodiments. Controller 110 includes one or more interface(s) 112, processing circuitry 114, and memory 116.

In some embodiments, interface 112 facilitates communicating signals to/from HVAC systems 120, 125, refrigeration systems 130, 135, and/or automation equipment 140, 145. Processing circuitry 114 executes instructions to provide some or all of the control functionality for the HVAC systems 120, 125, refrigeration systems 130, 135, and/or automation equipment 140, 145. Processing circuitry 114 may process data received from HVAC systems 120, 125, refrigeration systems 130, 135, and/or automation equipment 140, 145. Memory 116 stores the instructions for execution by processing circuitry 114 and any other suitable type of data such as data received HVAC systems 120, 125, refrigeration systems 130, 135, and/or automation equipment 140, 145. As an example, processing circuitry 114 may process user input received through interface 112 and setting a heating set point schedule based on the user input, which may be then applied to control when equipment of HVAC system 120 is turned on or off. Processing circuitry 114 may also generate alerts to indicate that one or more pieces of equipment is not performing within a predetermined threshold.

Interface 112 may comprise a wired or wireless interface and may be configured to communicate with components of the HVAC systems 120, 125, refrigeration systems 130, 135, and/or automation equipment 140, 145 through any suitable network. Processing circuitry 114 may include any suitable combination of hardware and software implemented in one or more modules to execute instructions and manipulate data to perform some or all of the described functions. In some embodiments, processing circuitry 114 may include, for example, one or more computers, one or more central processing units (CPUs), one or more microprocessors, one or more applications, one or more application specific integrated circuits (ASICs), one or more field programmable gate arrays (FPGAs) and/or other logic.

In certain embodiments, interface 112 includes a plurality of interfaces that are configured to communicate with one or more protocols of the HVAC systems 120, 125, refrigeration systems 130, 135, and/or automation equipment 140, 145. For example, each type of system may use a different protocol for transmitting telemetry data. In some examples, interface 112 may include interfaces that are configured to receive information from each type of system using the internal protocols used by each respective system. In this manner, interface 112 may communicate with the various types of systems to communicate the operation schedule to each system.

Memory 116 is generally operable to store instructions, such as a computer program, software, an application including one or more of logic, rules, algorithms, code, tables, etc. and/or other instructions capable of being executed by a processor. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information, data, and/or instructions that may be used by processing circuitry 114 of controller 110.

Other embodiments of controller 110 may include additional components beyond those shown in FIG. 2 that may be responsible for providing certain aspects of controller 110's functionality, including any of the functionality described above and/or any additional functionality (including any functionality necessary to support the solution described above). As just one example, controller 110 may include input devices and output devices. Input devices include mechanisms for entry of data into controller 110. For example, input devices may include input mechanisms, such as a microphone, input elements, a display, a keyboard, etc. Output devices may include mechanisms for outputting data in audio, video, and/or hard copy format. For example, output devices may include a speaker, a display, etc. Input devices and output devices may be provided at controller 110 in order to provide communication between controller 110 and HVAC systems 120, 125, refrigeration systems 130, 135, and/or automation equipment 140, 145.

While controller 110 has been described as a singular apparatus, in certain embodiments, one or more features or functions of controller 110 may be distributed over one or more separate control apparatuses located remote from each other. For example, controller 110 may include control modules integrated into each of HVAC systems 120, 125, refrigeration systems 130, 135, and/or automation equipment 140, 145 to provide for more direct and detailed control of those systems. In some embodiments, controller 110 may be coupled to one or more servers that may store or process data aiding in the scheduling of the various systems.

FIG. 3 is a table 300 of example settings 310 which may be controllable at respective connected equipment of system 100, according to certain embodiments. As discussed above, HVAC systems 120, 125, refrigeration systems 130, 135, and/or automation equipment 140, 145 may each include respective equipment which may be controlled via one or more settings. Scheduling the various equipment in HVAC systems 120, 125, refrigeration systems 130, 135, and/or automation equipment 140, 145 may include scheduling the operation of particular equipment in each system at various times and/or conditions. Table 300 illustrates a few examples of controllable settings for each type of system mentioned herein, but is not meant as an exhaustive or exclusive list of controllable settings.

In certain embodiments, one or more settings in table 300 may be controllable by an operation schedule determined by controller 110. For example, HVAC systems 120, 125 may include various settings 310 including temperature setpoints, power efficiency settings, power limitations, intake source, etc. Each of these settings may be scheduled individually. For example, controller 110 may determine an operation schedule for first set 150 that individually schedules the temperature setpoints and power efficiency schedule for HVAC system 120. In some embodiments, one or more settings may be dependent on one another or the schedule may reflect dependency rules based on one or more settings for each system.

Also shown in table 300 are example settings for refrigeration systems and automations systems, such as refrigeration systems 130, 135 and automation systems 140, 145. These settings may differ between the type of system. In certain embodiments, the operational schedule determined by controller 110 may include schedules for each type of system within the set of equipment. For example, controller 110 may determine a operational schedule for set of equipment 150 by generating a schedule for the combination of HVAC system 120, refrigeration system 130, and automation equipment 140. Although illustrated as separate settings for each type of system, the operational schedule determined at controller 110 may include interdependent scheduling between settings of different types of systems. For example, the operational schedule may include scheduling the intake air source of HVAC system 120 based on the on/off status of certain equipment within the same space. Accordingly, controller 110 may determine a variety of different operational schedules for each set of equipment based on the desired operation of the set of equipment and the circumstances of the space in which the set of equipment is located.

In certain embodiments, controller 110 allows one or more users to control the scheduling of one or more sets of equipment based on information provided by the users. In an example embodiment, a user accesses controller 110. For example, a user may log onto a portal hosted by controller 110 using a laptop computer or any other suitable device. Once logged onto controller 110, a user may select one or more locations, and any specific equipment at the locations. Once specific location and equipment is selected, a user may create a catalog of schedules. Each schedule may include a time of day when equipment activities should occur. For example, a schedule may indicate set points for HVAC equipment 120, set points for refrigeration system 130, and/or schedules for automation equipment 140. Controller 110 may communicate the schedule of activities to HVAC equipment 120, refrigeration system 130, and/or automation equipment 140. Providing schedules to equipment in mass provides the advantage of remotely implementing uniform scheduling across a plurality of equipment at a plurality of locations. In this manner, an operator may take centralized control of a plurality of remote locations and schedule HVAC, refrigeration, and building automation systems remotely and in a uniform manner.

In certain embodiments, a user may override a schedule of one or more pieces of equipment. For example, a user at a location may adjust a temperature setting for the location. If a user onsite changes a schedule, controller 110 may generate a flag for the modification, in some embodiments. Controller 110 may facilitate renaming the schedule for identification. Flagging and renaming a schedule allows a user a at remote location to determine when a schedule change is made and the purpose for the change.

FIG. 4 is an example diagram of sites 410, 415 at different locations each having a respective set of equipment 450, 455, according to certain embodiments. In certain embodiments, a user may control the operation of equipment at a plurality of locations. For example, a user may have control over equipment at sites 410 and 415, which in this example are located in disparate locations in the United States. Despite the large distances between sites 410 and 415, user may use controller 110 to schedule both first set of equipment 450 and second set of equipment 455 located at their respective sites. In this manner, controller 110 may enable user to remotely schedule each set of equipment.

In certain embodiments, first set of equipment 450 and second set of equipment 455 may share at least some similarities between their configurations, including they type of equipment that is present in each set. If a portion of the configuration of first set of equipment 450 is the same as a portion of the configuration of second set of equipment 455, controller may set at least a portion of a first operation schedule for first set of equipment 450 to be the same as at least a portion of a second operation schedule the second set of equipment 455. For example, if first set of equipment 450 and second set of equipment 455 have the same configuration of HVAC systems and are located in similar buildings, a user may desire the same settings for both locations. Controller 110 may infer the similarities and schedule the HVAC systems with the same operation schedule based on that interference, or alternatively the user may identify which systems or parts thereof should be scheduled similarly.

Configurations of each set of equipment may be compared at any suitable level of granularity. For example, configurations may be compared by comparing the type of systems contained within each set of equipment, e.g., two HVAC systems can have the same operation schedule or two refrigeration systems can have the same operation schedule. As another example, configurations may be compared at the model level, wherein configurations may be the same or similar if they share the same model of equipment within their respective systems. In some embodiments, even further granularity may be used in comparing configurations between sets of equipment. For example, configurations may be compared on the hardware and/or software version used in the respective pieces of equipment. In some embodiments, configurations may be compared based on the number and/or type of components used in each system. For example, two HVAC systems with X compressors having Y capacity can be given the same operation schedule.

In certain embodiments, controller 110 may provide different operation schedules for each of first set of equipment 450 and second set of equipment 455. Differences between the first operation schedule and the second operation schedule may be based on differences between locations, ambient environments, geographical regions, and/or configurations of the first and second sets of equipment. As discussed above, like configurations may be scheduled similarly, but may also reflect differences in the sites at which they are located. For example, sites 410 and 415 are located in different regions of the United States, which may have different climates, weather, and energy restrictions. Controller 110 may take these considerations into account when creating the operation schedules for each set of equipment. For example, a user may input the same temperature settings for both sites 410 and 415 and controller 110 may adjust individual settings for each system within each set of equipment 450 and 455 to achieve that temperature setting.

In certain embodiments, each of HVAC systems 120, 125 refrigeration systems 130, 135 and automation system 140, 145 may include components such as sensors and switches that work with the functional portions of each system to sense the conditions within each system and control its operation. Examples of sensors include, but are not limited to, temperature sensors, humidity sensors, light sensors, occupancy sensors, motion sensors, proximity sensors, sound sensors, touch sensors, and pressure sensors. Examples of switches include, but are not limited to, pressure switches, toggle switches, mechanical switches, electronic switches, mercury tilt switches, touch switches, push button switches, rotary switches, and momentary switches. Each sensor and/or switch may generate telemetry data, which may be communicated to controller 110.

In certain embodiments, controller 110 may receive telemetry data from each set of equipment 450, 455 and adjust the operation schedule based on the received telemetry data. For example, telemetry data from first set of equipment 450 may indicate that HVAC system 120 can only operate in a partial load capacity due to requiring maintenance on one of its compressors. Controller 110 may then adjust the operation schedule of first set of equipment 450 to ensure that HVAC system 120 does not operate above partial load capacity by adjusting one or more settings to ensure that the desired environment is still achievable despite the reduced capacity of HVAC system 120.

In certain embodiments, schedules for multiple sets of equipment may be communicated to each respective set of equipment at the same time. For example, controller 110 may determine the operational schedules for first set of equipment 450 and second set of equipment 455 and communicate those schedules simultaneously over network 160. In some embodiments, controller 110 may be configured to mass schedule a plurality of sets of equipment. Controller 110 may receive a request to perform mass scheduling, such as an indication from user to schedule a plurality of sets of equipment. The request may indicate what sets of equipment and which settings of the operation scheduled are to be configured using the mass scheduling. For example, user may identify multiple locations each containing a set of equipment and may further indicate which systems and/or individual settings should be mass scheduled. User may provide those settings and indicate to controller 110 to apply those settings to every indicated set of equipment. Further, controller may communicate operational schedules to each of the indicated sets of equipment. The communicated operational schedules may include the same values for the settings that the request indicates to configure using the mass scheduling to each set of equipment that the request indicates to configure using the mass scheduling. In this manner, a user or operator may use controller 110 to mass schedule a plurality of locations.

FIG. 5 is a flowchart diagram of an example method 500 of using system 100, according to certain embodiments. In particular embodiments, various components of system 100 perform the steps of method 500. Method 500 may begin at step 520, wherein an operation schedule for a set of equipment is determined. For example, an operation schedule for each equipment and/or system, such as the equipment in HVAC system 120, refrigeration system 130, and/or automation system 140. The operation schedule may be based on a variety of information, including information about the configuration and characteristics of the equipment to be scheduled and/or user inputted data, such as desired operation or environmental conditions at certain time periods.

Once determined, at step 530, the operation schedule for the set of equipment may be communicated to the set of equipment. For example, controller 110 may communicate the schedule over network 160 and to each individual system. In this manner, the set of equipment may receive its operation schedule from a centralized system, such as controller 110. Steps 520 and 530 may be repeated for each set of equipment. In some embodiments, steps 520 for respective sets of equipment are carried out concurrently and steps 530 for respective sets of equipment are carried out concurrently. In some embodiments, steps 520 and 530 may be repeated for the same set of equipment in response to a change of information regarding the equipment in the set and/or newly inputted or changed user input. In this way, schedules may be determined to reflect the most up-to-date information available.

Modifications, additions, or omissions may be made to method 500 depicted in FIG. 5. Method 500 may include more, fewer, or other steps. In some embodiments, method 500 may further include optional step 510 and option step 540. In optional step 510, a request to perform mass scheduling may be received. For example an operator of more than one sets of equipment at various locations may send a request to controller 110 to schedule the more than one sets of equipment en masse. The request may indicate which sets of equipment and which settings of the operation scheduled are to be configured using the mass scheduling. In this manner, controller 110 may determine which equipment is being mass scheduled and what aspects of the operation schedule are to be applied to each set of equipment. In optional step 540, the mass scheduling may be communicated to the sets of equipment indicated in the mass scheduling request. For example, controller 110 may communicate the same values to each set of equipment indicated in the request for at least the settings indicated in the request. As a more specific example, the mass scheduling request may identify five locations having the same HVAC system set-up and indicate that the temperature setpoint schedule should be mass scheduled for the HVAC equipment at those five locations. Controller 110 may determine an operation schedule for the sets of equipment including the HVAC systems at those locations in step 520 and in steps 530 and 540 communicate the operation schedule to those sets of equipments, including communicating the same temperature setpoint values scheduling information to the HVAC equipment at those five locations. In this manner, sets of equipment sharing one or more characteristics may be mass scheduled from a centralized system.

Additionally, steps may be performed in parallel or in any suitable order. While discussed as various components of system 100 performing the steps, any suitable component or combination of components of system 200 may perform one or more steps of the method.

Certain embodiments may provide one or more technical advantages. For example, certain embodiments may determine the schedules of multiple sets of equipment at a centralized system and communicate that schedule to each respective set of equipment. In this manner, multiple sets of equipment may be scheduled concurrently through a single system, reducing the need for an operator to separately schedule each set of equipment or different types of equipment within each set of equipment. As another example, certain embodiments may allow information about other sets of equipment to be used in determining the schedule for other sets of equipment. In this manner, similarities and differences between different sets of equipment may be analyzed and used to apply the same schedules to like configurations and adjusting schedules to accommodate differences. As a result, more optimal scheduling may be provided from the centralized system. As yet another example, certain embodiments allow the system to mass schedule multiple sets of equipment at the same time.

Accordingly, a single schedule may be applied to multiple sets of equipment simultaneously, reducing the need to individually schedule each set. Operational schedules for different sets of equipment may be communicated simultaneously, such as in parallel from controller 110, initiated in response to the same event, such as expiry of a timer. Although multiple schedules may be communicated simultaneously from controller 110, each set of equipment may receive the operational schedule at different times due to latency in the communication network and the time it takes for the each system to apply the operational schedules.

Certain embodiments may include none, some, or all of the above technical advantages. One or more other technical advantages may be readily apparent to one skilled in the art from the figures, descriptions, and claims included herein.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

What is claimed is:

1. A system comprising:
   at least two sets of equipment, wherein each set of equipment comprises at least one of a heating, ventilation, and air conditioning (HVAC) equipment, refrigeration equipment, or building automation equipment, wherein the at least two sets of equipment comprise a first set of equipment with a first configuration and a second set of equipment with a second configuration, the first set of equipment located in a different location than the second set of equipment;
   a controller configured to:
   communicatively couple to each set of equipment; and
   for each set of equipment:
      determine an operation schedule for the respective set of equipment;
      communicate the operation schedule to the respective set of equipment;
      determine that at least a portion of the first configuration is the same as at least a portion of the second configuration; and
      in response, set at least a portion of a first operation schedule for the first set of equipment to be the same as at least a portion of a second operation schedule for the second set of equipment.

2. The system of claim 1, wherein differences between the first operation schedule and the second operation schedule are based on differences between locations, ambient environments, geographical regions, and/or configurations of the first and second sets of equipment.

3. The system of claim 1, wherein the controller is further configured to:
   receive a request to perform mass scheduling, the request indicating which sets of equipment and which settings of the operation schedule are to be configured using the mass scheduling; and
   communicate the same values for the settings that the request indicates to configure using the mass scheduling to each set of equipment that the request indicates to configure using the mass scheduling.

4. The system of claim 1, wherein the system is further configured to remotely schedule each set of equipment.

5. A controller configured to:
   communicatively couple to at least two sets of equipment, wherein at least one set of equipment comprises heating, ventilation, and air conditioning (HVAC) equipment, refrigeration equipment, or building automation equipment, wherein the at least two sets of equipment comprise a first set of equipment with a first configuration and a second set of equipment with a second configuration, the first set of equipment located in a different location than the second set of equipment; and
   for each set of equipment:
      determine an operation schedule for the respective set of equipment;
      communicate the operation schedule to the respective set of equipment;
      determine that at least a portion of the first configuration is the same as at least a portion of the second configuration; and
      in response, set at least a portion of a first operation schedule for the first set of equipment to be the same as at least a portion of a second operation schedule for the second set of equipment.

6. The controller of claim 5, wherein the controller is further configured to remotely schedule each set of equipment.

7. The controller of claim 5, wherein differences between the first operation schedule and the second operation schedule are based on differences between locations, ambient environments, geographical regions, and/or configurations of the first and second sets of equipment.

8. The controller of claim 5, wherein the controller is further operable to:
   receive first telemetry data associated with the first set of equipment;
   adjust the first operation schedule based on the first telemetry data;
   receive second telemetry data associated with the second set of equipment; and
   adjust the second operation schedule based on the second telemetry data.

9. The controller of claim 5, wherein the controller is further configured to communicate the operation schedule to a first set of equipment and a second set of equipment simultaneously.

10. The controller of claim 5, wherein the at least two sets of equipment comprise:
   a first set of HVAC equipment located in a first geographical region;

a first set of building automation equipment located in the first geographical region;
a second set of HVAC equipment located in a second geographical region; and
a second set of building automation equipment located in the second geographical region.

11. The controller of claim 5, wherein the controller is further configured to:
receive a request to perform mass scheduling, the request indicating which sets of equipment and which settings of the operation schedule are to be configured using the mass scheduling; and
communicate the same values for the settings that the request indicates to configure using the mass scheduling to each set of equipment that the request indicates to configure using the mass scheduling.

12. A method, comprising:
communicatively coupling to at least two sets of equipment, wherein at least one set of equipment comprises heating, ventilation, and air conditioning (HVAC) equipment, refrigeration equipment, or building automation equipment, and the at least two sets of equipment comprise a first set of equipment with a first configuration and a second set of equipment with a second configuration, the first set of equipment located in a different location than the second set of equipment; and
for each set of equipment:
determining an operation schedule for the respective set of equipment;
communicating the operation schedule to the respective set of equipment;
determining that at least a portion of the first configuration is the same as at least a portion of the second configuration; and
in response, setting at least a portion of a first operation schedule for the first set of equipment to be the same as at least a portion of a second operation schedule for the second set of equipment.

13. The method of claim 12, wherein differences between the first operation schedule and the second operation schedule are based on differences between locations, ambient environments, geographical regions, and/or configurations of the first and second sets of equipment.

14. The method of claim 12, further comprising:
receiving first telemetry data associated with the first set of equipment;
adjusting the first operation schedule based on the first telemetry data;
receiving second telemetry data associated with the second set of equipment; and
adjusting the second operation schedule based on the second telemetry data.

15. The method of claim 12, further comprising communicating the operation schedule to a first set of equipment and a second set of equipment simultaneously.

16. The method of claim 12, wherein the at least two sets of equipment comprise:
a first set of HVAC equipment located in a first geographical region;
a first set of building automation equipment located in the first geographical region;
a first set of refrigeration equipment located in the first geographical region;
a second set of HVAC equipment located in a second geographical region;
a second set of building automation equipment located in the second geographical region; and
a second set of refrigeration equipment located in the second geographical region.

17. The method of claim 12, further comprising:
receiving a request to perform mass scheduling, the request indicating which sets of equipment and which settings of the operation schedule are to be configured using the mass scheduling; and
communicating the same values for the settings that the request indicates to configure using the mass scheduling to each set of equipment that the request indicates to configure using the mass scheduling.

* * * * *